Jan. 9, 1934.  J. W. B. LADD  1,942,654
APPARATUS FOR MAKING ABSORBENT DENTAL ROLLS
Original Filed May 2, 1928  3 Sheets-Sheet 1
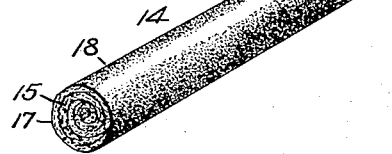
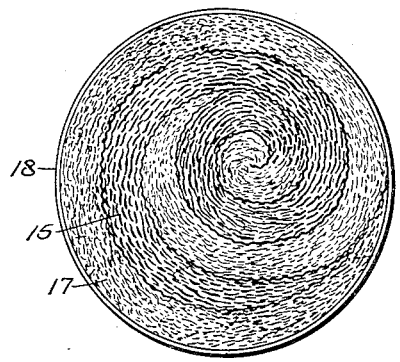
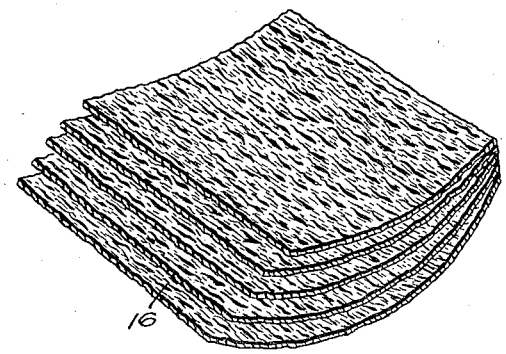
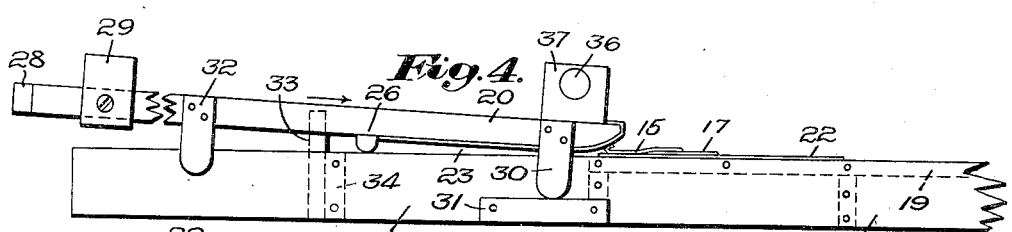
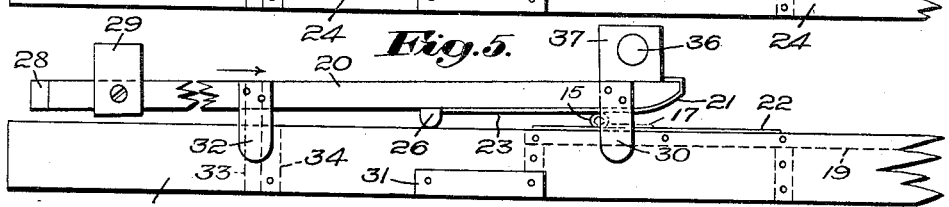
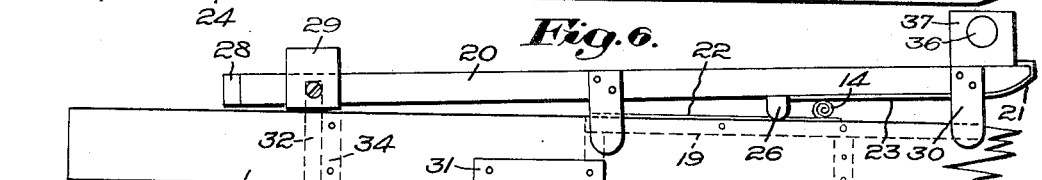
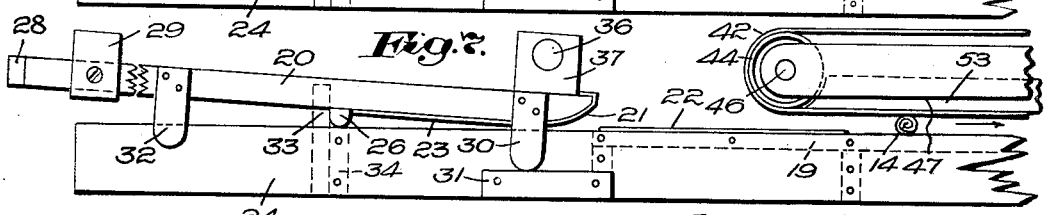
Inventor:
John W. B. Ladd,
by Emery, Booth, Varney & Townsend
Attys

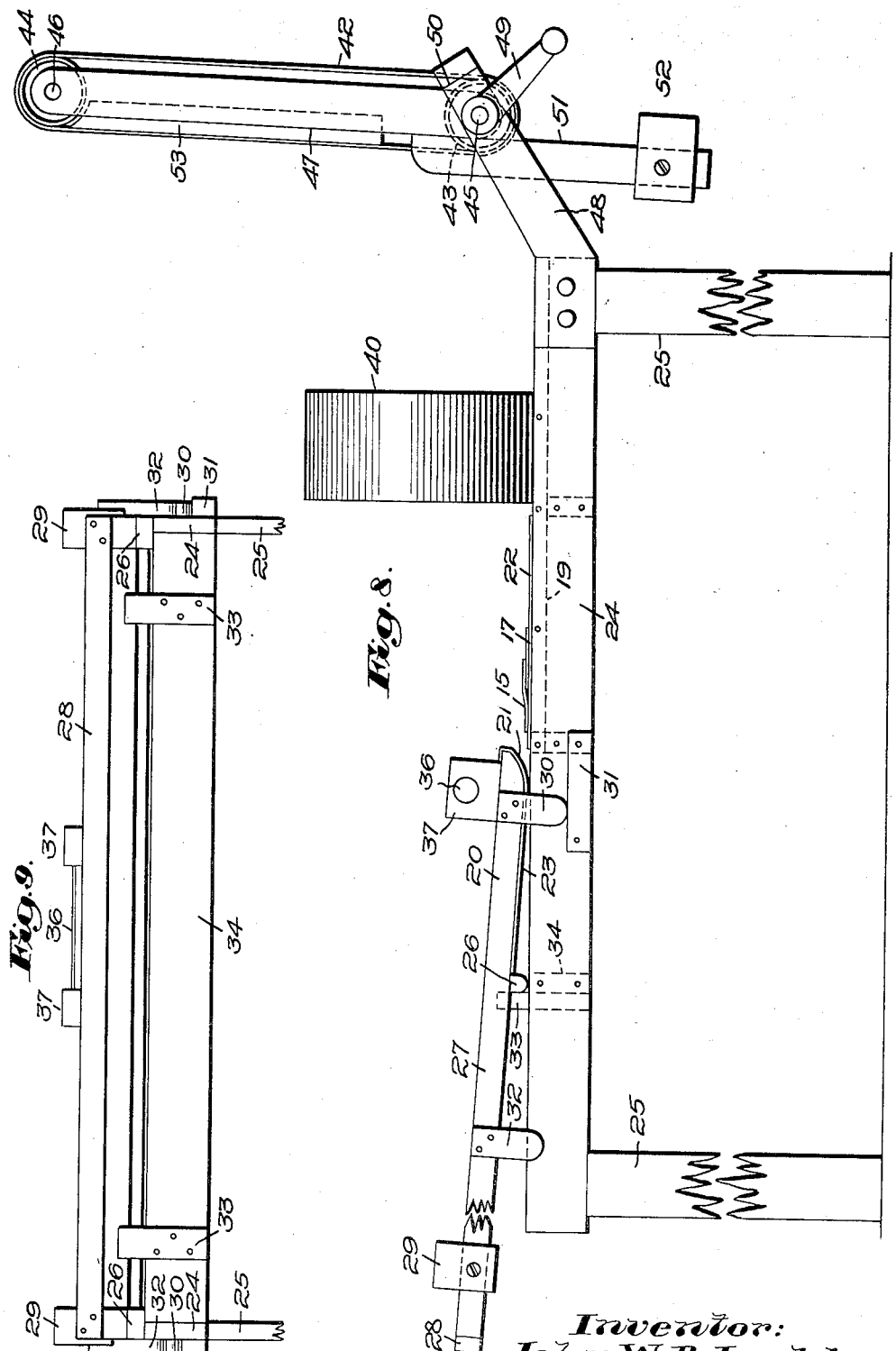

Jan. 9, 1934.          J. W. B. LADD          1,942,654
APPARATUS FOR MAKING ABSORBENT DENTAL ROLLS
Original Filed May 2, 1928     3 Sheets-Sheet 3
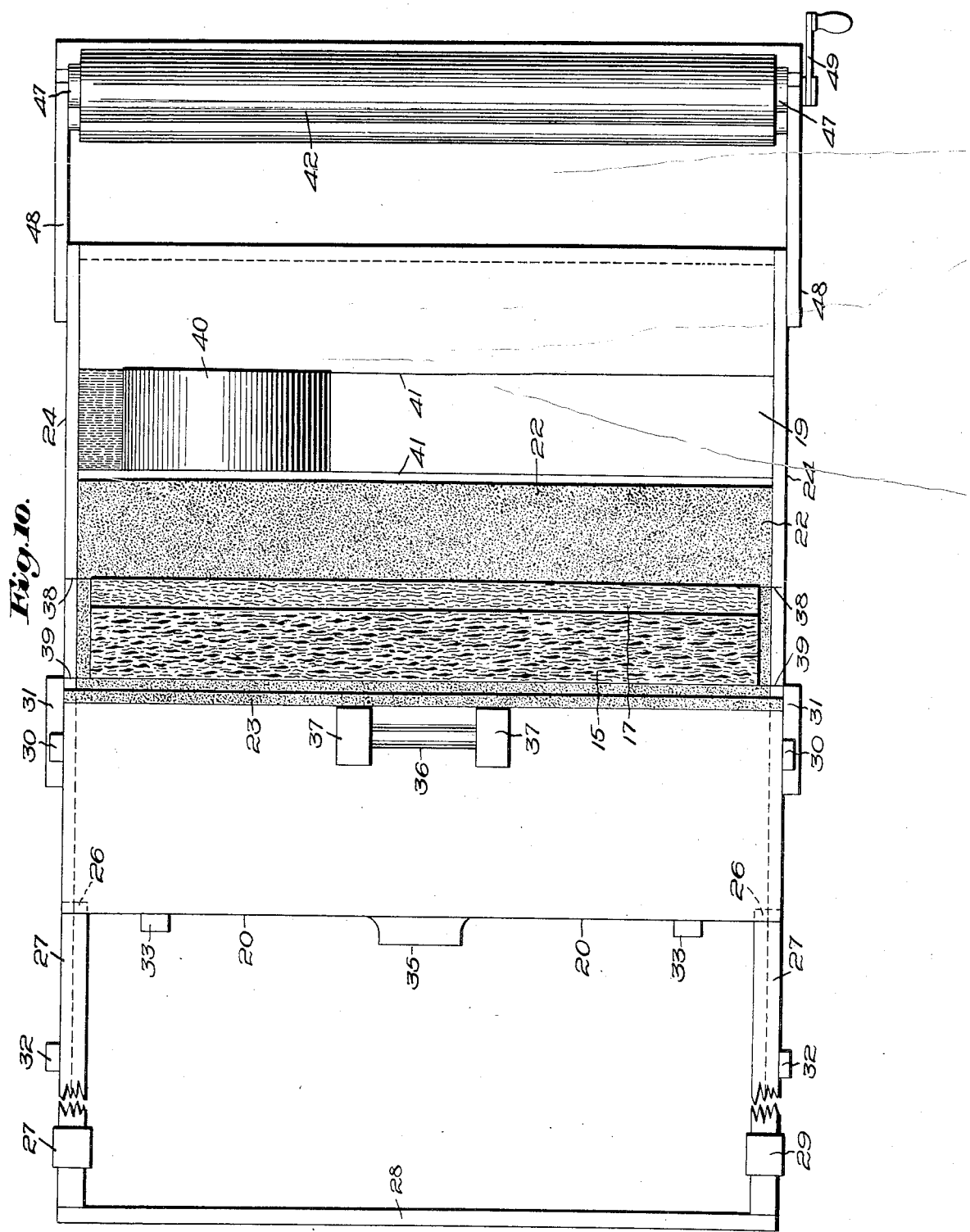

Patented Jan. 9, 1934

1,942,654

UNITED STATES PATENT OFFICE 1,942,654

APPARATUS FOR MAKING ABSORBENT DENTAL ROLLS

John W. B. Ladd, Katonah, N. Y.

Original application May 2, 1928, Serial No. 274,594. Divided and this application May 14, 1929. Serial No. 362,986

21 Claims. (Cl. 93—1)

This invention relates to means for making an absorbent dental roll. The application is a division of my prior application, Ser. No. 274,594, filed May 2, 1928.

The invention will be best understood by reference to the following description, when taken in connection with the accompanying drawings of one specific embodiment of the roll and of an apparatus for making the same, while its scope will be more particularly pointed out in the appended claims.

In the drawings:

Fig. 1 is a perspective view of a dental roll made by apparatus exemplifying the invention;

Fig. 2 is an end elevation of the same on a much enlarged scale;

Fig. 3 is a perspective view, on an enlarged scale, showing the several layers of the soft, fluffy sheet of paper, which is one of the elements of the roll;

Figs. 4 to 7, inclusive, are side elevations of portions of the apparatus used in making the roll;

Fig. 8 is a side elevation of the apparatus;

Fig. 9 is an end elevation of the apparatus as viewed from the left-hand end of Fig. 8; and Fig. 10 is a plan of the apparatus.

Referring to Figs. 1 and 2 of the drawings, and to the article which is made by the apparatus exemplifying the invention, there is shown a dental roll 14, comprising a body 15 of highly absorbent paper, having a soft and fluffy texture. Referring to Fig. 3, which shows a piece of this paper on a very much enlarged scale with the layers partially separated, the sheet employed in the present example is composed of several layers 16, herein five in number, although it should be understood that the number may be varied to suit the desired dimensions of the completed roll, and to suit the particular method of manufacture which is chosen. With this number of layers, the sheet, when not under compression, is approximately $\frac{3}{32}$ to $\frac{1}{16}$ of an inch thick. This material, though possessing the greatly desired characteristic of being highly absorbent, has a marked tendency to become disintegrated when wet. In this embodiment, therefore, I have combined with the absorbent paper a body 17 of absorbent cotton, which, although far less absorbent than the paper, nevertheless has little or no tendency to become disintegrated when wet. The two bodies are so combined that the body of absorbent cotton serves as a binder for the body of absorbent paper, thereby to prevent disintegration of the latter. In the present example, the absorbent paper is in the nature of a core, and the absorbent cotton is in the nature of a wrapper or jacket about the core.

In the present instance, the two bodies are conveniently combined by rolling the sheet of absorbent paper upon itself, and by rolling the absorbent cotton about the absorbent paper, but with a portion of the absorbent cotton interposed between two convolutions of the absorbent paper, the relative widths and the placing of the two sheets being such that when the winding of the roll is completed, the sheet of absorbent cotton constitutes a complete wrapper for the absorbent paper, leaving none of the latter exposed at the circumferential surface of the roll, as will be evident from an inspection of Fig. 2.

Best results are obtained by having the fibers of the absorbent paper extending lengthwise of the completed roll, as it is found that the paper has much less tendency to unwind when the fibers are lengthwise than is the case if the fibers extend circumferentially. In the present example, the fibers of the absorbent cotton, as well as those of the absorbent paper, extend lengthwise of the completed roll.

Applied to the periphery of the roll is an appropriate binder, herein a coating 18 of adhesive such as starch, which sticks the outer end of the cotton to the next convolution of the latter, and prevents the roll from unwinding. The starch coating lays the nap, or fuzz, of the cotton so that the latter presents a smooth, non-clinging exterior. The rolls can then be handled without adhering to one another, and without becoming fuzzy. The nature of this starch coating is such that when the roll is completed, the coating is comparatively insoluble, and the roll will not come apart when it comes in contact with the saliva in the mouth.

One satisfactory coating is made by the use of a thick, boiling corn-starch in the proportions of 40 grams of the starch to 200 cubic centimeters of water. The starch is placed in cold water, which is then heated and stirred briskly while heating, until the mixture coagulates. It should be as thick as possible without lumping, when applied. If desired, a suitable preservative, such as $\frac{1}{10}$ per cent. boric acid may be added, to give the starch keeping qualities, and to keep the finished rolls from mildewing. In preparing the starch, accurate temperature control is desirable, as the stickiness of the starch is affected thereby.

In practice, it is found that if the starch coating be allowed to dry at ordinary room temperature, the coating is apt to lack firmness. Best results are secured by baking the roll at a temperature of from 180 to 212 degrees Fahrenheit for a period of approximately four minutes. The practicable limits are between one minute at 100 degrees Fahrenheit and five minutes at 300 degrees Fahrenheit. The temperature and the time of baking are dependent largely upon the size of the oven and the number of rolls in it. It is evident that the more rolls there are in the oven, the more moisture is given off during the baking.

One method of assembling the paper and the cotton is to superimpose the sheet of paper 15 upon the sheet of cotton 17, with one overlapping the other (see Figs. 8 and 10). The next step is to roll the sheet of paper upon itself transversely of the overlapping edges. It is found that the two sheets adhere to each other so well that, as the rolling is continued, the sheet of paper picks up the sheet of cotton, and the latter is rolled with the former, until, as shown in Fig. 2, the remaining margin of the cotton overlaps the remaining margin of the paper, and overlies a preceding part of the last convolution of the cotton. The coating of starch can then be applied, and the roll baked.

The rolling is conveniently accomplished by the use of two non-slipping surfaces, one moving relatively to the other transversely of the axis of rotation of the roll,—that is to say, one surface moves generally parallel with the other with the sheet between them. Referring to Fig. 8, I have shown for this purpose two bodies 19 and 20. An important point in picking up the edge of the paper and starting the rolling action is the fact that the body 20 has a portion 21 which diverges from the body 19, and herein is convexly curved. One convenient way of providing these bodies with non-slipping surfaces is to face them with sand paper, or emery cloth, and in Fig. 8, I have shown the body 19 provided with such a facing 22, and the body 20 provided with such a facing 23. If the bodies are made of wood, these facings may be cemented or glued on, or they may be fastened by tacks. If, however, the bodies are made of metal, they may be suitably roughened, as by knurling or grooving them, thus to provide very shallow ribs extending transversely of the direction of movement of the body 20 relatively to the body 19.

In the present example, the body 19 is in the nature of a platen forming a part of a table having two longitudinal frame members 24, secured to the sides of the platen and provided with legs 25 to rest upon the floor. These members are prolonged beyond the platen (toward the left in Fig. 8), and constitute rails which support and guide the body 20. It is important that the surfaces 22 and 23 be slightly separated from each other prior to and at the commencement of the rolling operation, and that a definite downward pressure be applied. The body 20 is arranged to gravitate toward the body 19, as by being provided with two rockers 26, adapted to ride along the rails 24. The body 20 is so balanced that its upwardly curved portion 21 tends to gravitate toward the body 19. This can be accomplished by proper placing of the rockers 26 relatively to the center of gravity of the body 20. In the present instance, the body 20 is provided with rearwardly extending arms 27, connected to each other by a cross-bar 28, and to these arms counterbalance weights 29 are secured. In any event, the proportions should be such that the front end tends to gravitate toward the rails and to exert a slight downward pressure, usually only a few ounces.

The degree of pressure will determine the compactness of the completed roll.

To secure best results, there should be a slight initial space (herein approximately $\frac{1}{32}''$) between the front end of the body 20 and the face of the platen 19, so that the former shall not rub on the latter. Minimum separation is predetermined by the use of shoes 30, carried by the body 20, and adapted to ride on the upper surfaces of guides 31 secured to the sides of the rails 24. These shoes also prevent lateral movement of the front end of the body 20 with relation to the rails. Lateral movement of the rear end of the body is prevented by similar depending projections 32, carried by the arms 27 adjacent the rear end of the body.

Backward movement of the body 20 (toward the left in Fig. 8) is limited by appropriate means, herein stops 33 arranged in the path of the rear edge of the body 20. These stops are conveniently mounted on a transverse bar 34, connecting the rails 24. These stops also serve to limit the forward movement of the body 20, by reason of the fact that when the latter is moved forward, the bar 28, which connects the rear ends of the arms 27, strikes said stops.

The body may be pushed forward without disturbing its balance by placing the fingers against the rear face of a handle 35 (see Fig. 10) adjacent the fulcrum point of the body. During the rearward, non-working movement of the body, its balance is a matter of no particular consequence, and it may be lifted and propelled rearwardly by grasping a handle 36 connecting a pair of uprights 37 on said body.

The operation of this part of the apparatus will now be described, reference being had at first to Fig. 10. A sheet of cotton 17 of the desired width and length is first laid upon the non-slipping surface 22 of the platen 19. In practice, this strip is usually approximately 24 inches long, and approximately 2 to 3 inches wide, it being understood that the fibers of the cotton extend lengthwise of the strip. The width of the platen should exceed the length of the strip of cotton by a sufficient margin, say ½" to 1", at each end of the latter.

The next step is to superimpose the strip of paper 15 upon the strip of cotton 17. The length of the strip of paper will be the same as that of the strip of cotton, and its width somewhat greater than that of the cotton. Naturally, the widths of these strips will vary in accordance with the diameters of the completed rolls which it is desired to make. The placing of the strip of paper on the platen may be determined accurately by the use of gage lines 38 and 39 on the surface of the platen. The placing of these lines, considered with reference to the widths of the strips, will naturally predetermine the degree of overlap of one strip upon the other.

The next step is to push the body 20 forward from the position shown in Figs. 8 and 10 toward the position shown in Fig. 4. The upwardly curved portion 21 of the surface 23 now encounters the adjacent edge of the paper, and starts to roll the latter upon itself, as shown in Fig. 4. Just as soon as the rolling starts, the front end of the body 20 commences to rise under the influence of the roll therebeneath (see Fig. 5), and presently the cotton, which clings to the paper, likewise commences to roll up, as shown in Fig. 5. As the rolling action proceeds to the final position shown in Fig. 6, the front end of the body 20 continues to rise. Of course, the travel of the body 20 along the platen 19 is twice that of the roll between them.

The assembling of the two sheets is now complete, and the roll is ready for the application of the starch. One convenient method of applying the starch is by first applying a coat of starch to the surface of the platen 19, and then causing the roll to traverse this coated area. The coating of the platen with a strip of starch of the desired width is conveniently accomplished by the use of a roller 40, first coated with starch and then rolled across the platen. The circumference of the starch roller should be substantially the same as the width of the platen, so that no portion of the roller shall contact with the platen more than once during its traverse of the latter. Accurate placing of the strip of starch may be predetermined by the use of one or more gage lines 41, extending transversely of the platen. Best results are secured by having the width of the strip of starch approximately twice the circumference of the absorbent roll. This insures the application of a sufficient amount of starch to prevent the occurrence of more or less dry spots here and there.

After the strip of starch has been applied to the platen, the roll is then rolled along the platen across the starched area, the width of which is at least as great as the circumference of the roll to be starched. This is conveniently accomplished in the present example by mechanism now to be described, reference being had at first to Fig. 8. A non-slipping, endless belt 42, herein conveniently made of textile fabric such as cotton, and having a width at least as great as the length of the roll, is carried by pulleys 43 and 44, which are secured to shafts 45 and 46, respectively. These shafts turn in bearings presented by a frame comprising two arms 47, by means of which the belt may be carried toward and from the platen. Herein, this frame to this end is pivotally mounted by prolonging the shaft 45 to extend through bearings presented by brackets 48 on the table. The belt is conveniently driven in the direction of the arrow adjacent thereto by a crank 49, secured to the shaft 45.

When the platen is being coated with paste by the roller 40, the belt is conveniently held up out of the way, as by swinging the same slightly beyond the vertical (see Fig. 8), further movement in such direction being limited by a stop, herein a bar 50 connecting the brackets 48, and disposed in the paths of the arms 47, but shaped to avoid interference with the belt 42.

When the paste roller has been withdrawn, the belt is lowered until it rests upon the roll. The pressure of the belt on the roll is conveniently predetermined by securing to one of the arms 47 an arm 51, which carries an adjustable counterbalance weight 52. Deflection of the belt where it contacts with the roll is conveniently avoided by the use of a backing plate or bar 53, carried by the arms 47 in contact with the inner surface of the belt.

After the belt has been brought down upon the roll, the belt is driven in the proper direction to cause the latter to propel the roll along the platen, and to traverse the coating of starch previously applied thereto. Continued movement of the belt carries the now starched roll to the end of the platen, where it may be deposited into a receptacle, or carried away by any appropriate means to the oven where it is to be baked.

The mode of operation of the apparatus will now be reviewed briefly. The two layers of material are placed in overlapping relationship upon the platen in the proper predetermined positions. The body 20 is then moved forward along the platen 19 a distance predetermined by the described stops to the position shown in Fig. 6. The body 20 is then lifted by grasping the handle 36, and is moved backward and restored to its initial position shown in Fig. 7. The starch roller is then rolled across the platen in the predetermined path, and after the starch roller has been carried out of the way, the belt is brought down upon the absorbent roll, and hence causes the latter to traverse the previously coated surface of the platen. The belt is then restored to its elevated position, and the cycle of operations is completed.

The described apparatus may be employed to make not only the composite rolls of superposed layers of cotton and paper, but may be used also with equal success in the manufacture of rolls of cotton alone, or paper alone, both of which have been made successfully.

Having thus described one embodiment of the invention, but without limiting myself thereto, what I claim and desire by Letters Patent to secure is:

1. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, said bodies being arranged for relative movement, one from the other, as the diameter of the roll increases.

2. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, the second-mentioned surface having a portion which diverges from the first-mentioned surface, said bodies being arranged for relative movement, one from the other, as the diameter of the roll increases.

3. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, said bodies being arranged for relative movement, one from the other, as the diameter of the roll increases, and means for limiting movement of said surfaces toward each other to a distance approximately the thickness of the material.

4. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, said bodies being arranged for relative movement, one from the other, as the diameter of the roll increases, and means for limiting movement of said surfaces one along the other.

5. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, said bodies being arranged for relative movement, one from the other, as the diameter of the roll increases, means for limiting movement of said surfaces toward each other to a distance approximating the thickness of the material, and means for limiting movement of said surfaces one along the other.

6. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, said bodies being arranged for relative movement, one from the other, as the diameter of the roll increases, and said bodies being cooperatively arranged to predetermine the pressure of one toward the other.

7. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, said bodies being arranged for relative movement, one from the other, as the diameter of the roll increases, one body being arranged for movement in two directions, one by gravity, toward and from and the other along the other body.

8. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge picks up and turns said edge rearwardly, rolls the sheet upon itself, and completes the formation of the roll, said bodies being arranged for relative movement, one from the other, as the diameter of the roll increases, one of said bodies being arranged to gravitate toward the other and being fulcrumed rearwardly of its front end which advances toward and engages said edge, thereby to rest by gravity on said edge as it picks up and turns said edge rearwardly.

9. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, one of said bodies being arranged for movement toward and from and along the other, one of said bodies being fulcrumed rearwardly of the front end which advances toward and engages said edge thereby to rest by gravity on said edge as it picks up and turns said edge rearwardly.

10. In an apparatus for producing rolls from sheet material of a soft, compressible nature, the combination of two bodies having opposed, non-slipping surfaces, one body being above and arranged to gravitate toward the other, the upper body being provided with rockers and the lower body presenting a track on which said rockers are arranged to travel.

11. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, one body being arranged for movement toward and from the other, said bodies being cooperatively arranged to predetermine the pressure of one toward the other, and means for predetermining movement of said surfaces one toward the other.

12. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, one body being arranged for movement toward and from and along the other, one of said bodies being arranged to gravitate toward the other, and means for predetermining movement of said surfaces one toward the other.

13. In an apparatus for producing a solid roll from a sheet of material of a soft, clingy nature, the combination of a body having a non-slipping surface on which the sheet is supported with an edge resting flatwise thereon, and a second body having a non-slipping surface which, when advanced toward and engaging said edge, picks up and turns said edge rearwardly, rolls the sheet upon itself, and completes the formation of the roll, one body being arranged for movement toward and from and along the other, one of said bodies being arranged to gravitate toward the other and being fulcrumed to swing relatively to the other, and means for predetermining such swinging.

14. In an apparatus for producing rolls from sheet material of a soft, compressible nature, the combination of two bodies having opposed, non-slipping surfaces, one body being above and arranged to gravitate toward the other, the upper body being provided with rockers and the lower body presenting a track on which said rockers are arranged to travel, and means for limiting the rocking movement of the upper body toward the lower body.

15. In an apparatus for producing rolls from sheet material, the combination of means for rolling the material upon itself to produce a generally cylindrical roll, and means for applying a coating to the roll by pressing said roll against a surface previously coated with a coating material and causing rotation of said roll and true, relative rolling action of said roll and said surface, to transfer coating material from said surface to said roll without rubbing action between said roll and said surface.

16. In an apparatus for producing rolls from sheet material of a soft, compressible nature, the combination of means for rolling the material upon itself to produce a generally cylindrical roll, means for applying a coating of adhesive to a surface, and a belt for rolling said roll along and pressing said roll against the coating of adhesive on said surface.

17. In an apparatus for producing rolls from sheet material of a soft, compressible nature, the combination of means for rolling the material upon itself to produce a generally cylindrical roll, means for applying a coating of adhesive to a surface, a belt for rolling said roll along and pressing said roll against the coating of adhesive on said surface, and means for moving said belt toward said roll to produce pressure thereagainst and from said roll to remove said pressure.

18. In an apparatus for producing rolls from sheet material of a soft, compressible nature, the combination of means for rolling the material upon itself to produce a generally cylindrical roll, means for applying a coating of adhesive to a surface, a belt for rolling said roll along and pressing said roll against the coating of adhesive on said surface, means for moving said belt toward said roll to produce pressure thereagainst and from said roll to remove said pressure, and means for driving said belt.

19. In an apparatus for producing rolls from sheet material of a soft, compressible nature, the combination of means for rolling the material upon itself to produce a roll, and pressure means for applying a coating to the outer surface of the otherwise completed roll.

20. In an apparatus for producing rolls from sheet material of a soft, compressible nature, the combination of means for rolling the material upon itself to produce a generally cylindrical roll, and means for applying a coating to the roll by rolling the roll along and pressing said roll against a surface previously coated with a coating material.

21. In an apparatus for producing rolls from sheet material of a soft, compressible nature, the combination of means for rolling the material upon itself to produce a generally cylindrical roll, means for applying a coating of adhesive to a surface, and means for rolling said roll along and pressing said roll against the coating of adhesive on said surface.

JOHN W. B. LADD.